June 17, 1947.  J. K. HOLBROOK  2,422,354
DOCUMENT COPYING CAMERA
Filed April 13, 1944  3 Sheets-Sheet 1

INVENTOR.
J. K. Holbrook
BY
ATTORNEY

June 17, 1947.  J. K. HOLBROOK  2,422,354

DOCUMENT COPYING CAMERA

Filed April 13, 1944  3 Sheets-Sheet 3

INVENTOR.
BY J. K. Holbrook
ATTORNEY

Patented June 17, 1947

2,422,354

UNITED STATES PATENT OFFICE 2,422,354

DOCUMENT COPYING CAMERA

John K. Holbrook, New York, N. Y., assignor to Holbrook Microfilming Service Inc., New York, N. Y., a corporation of Delaware Application April 13, 1944, Serial No. 530,864

3 Claims. (Cl. 88—24).

The present invention relates to a novel and improved recording camera and more particularly to a camera adapted to take a succession of record photographs in rapid succession.

Objects and advantages of the invention will be set forth in part hereinafter and in part will be obvious from, or may be learned by practice with the invention, the same being realized and attained by means of the instrumentalities and combinations pointed out in the appended claims.

The invention consists in the novel parts, constructions, arrangements, combinations and improvements herein shown and described.

Of the drawings:

Fig. 5 is a detailed section taken on the line 5—5 of Fig. 2.

Figure 1:
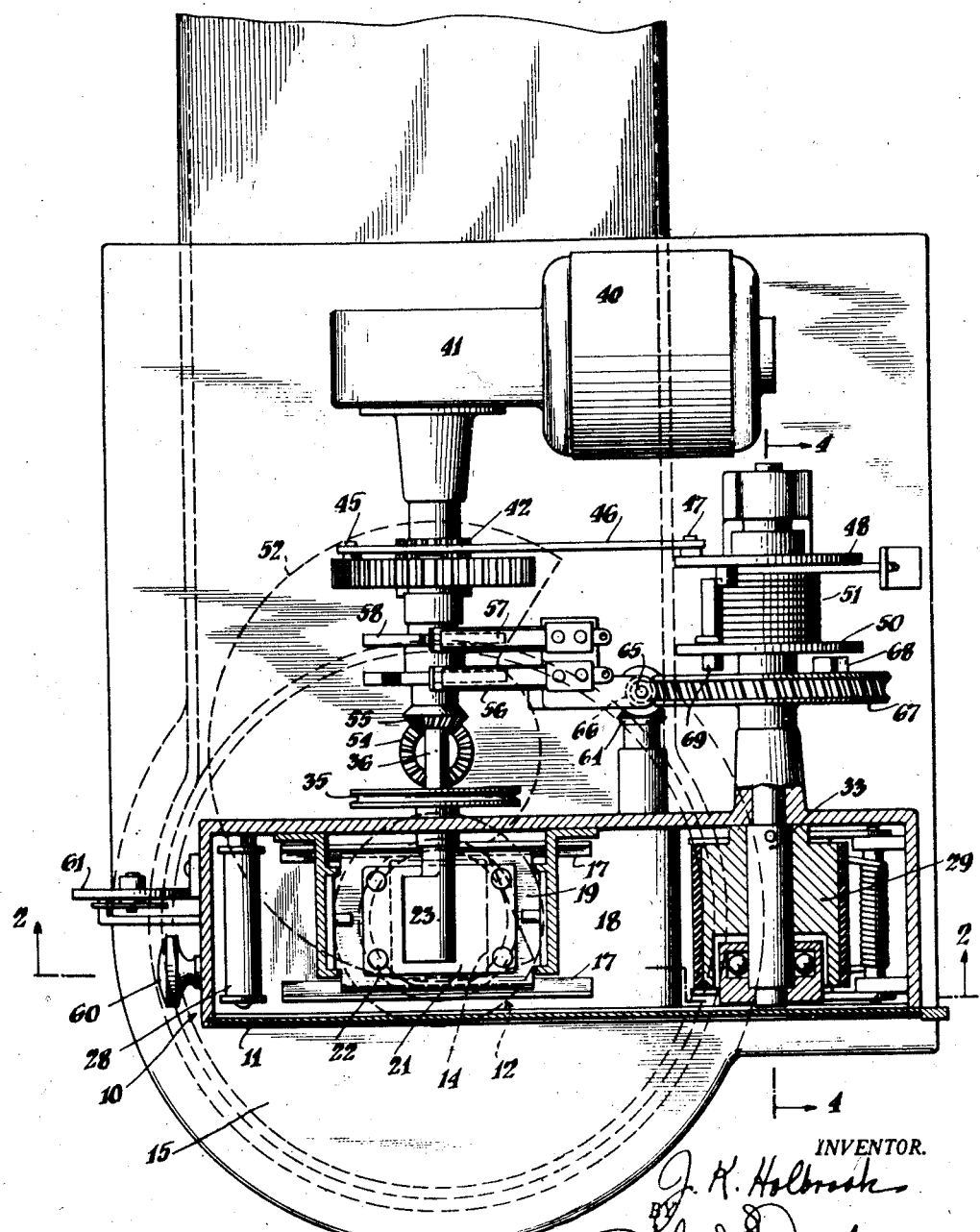
Fig. 1 is a sectional plan view of an illustrative and typical embodiment of the present invention.
Figure 2:
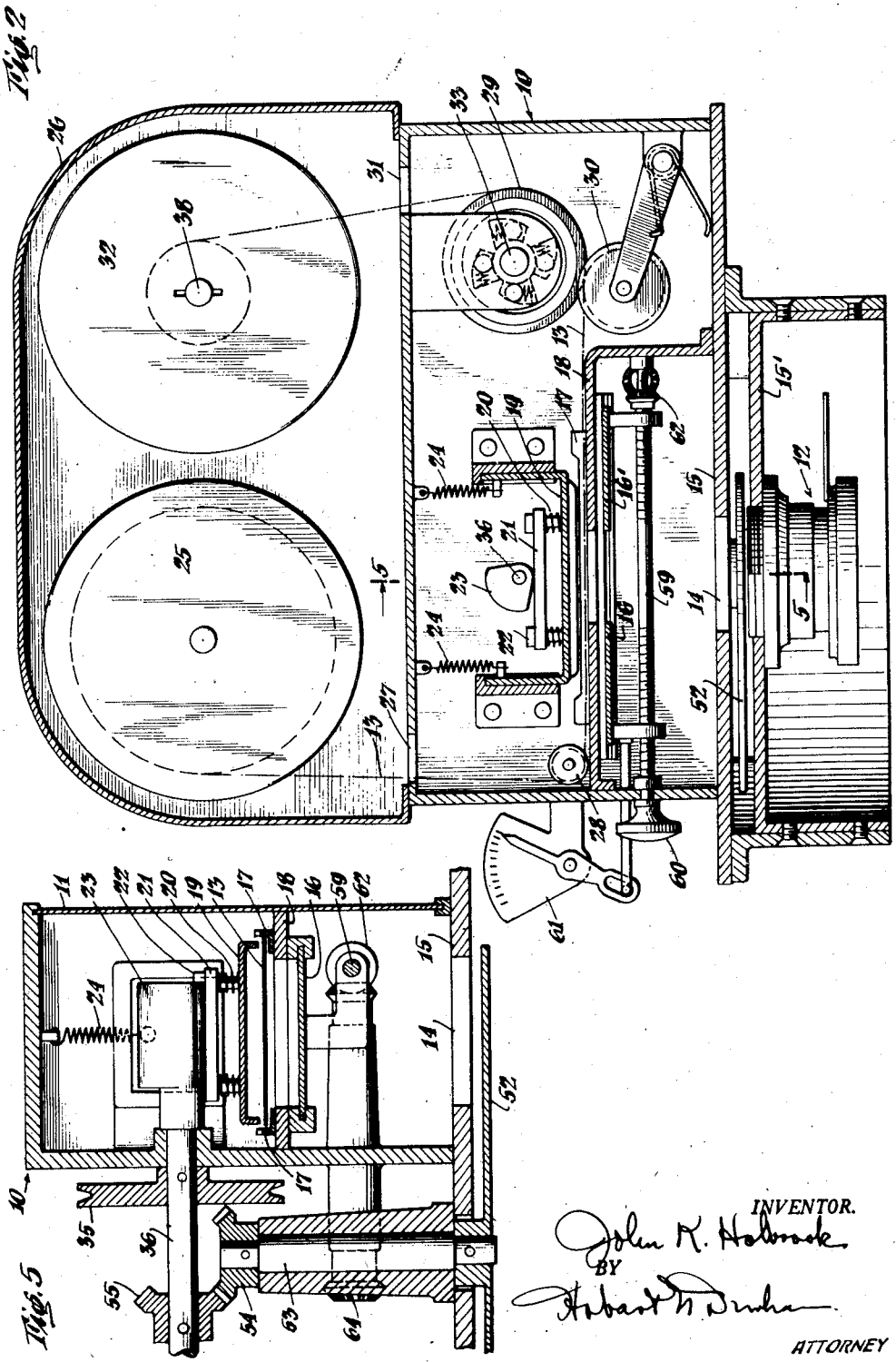
Fig. 2 is a vertical section of the camera taken substantially on the line 2—2 of Fig. 1.
Figure 3:
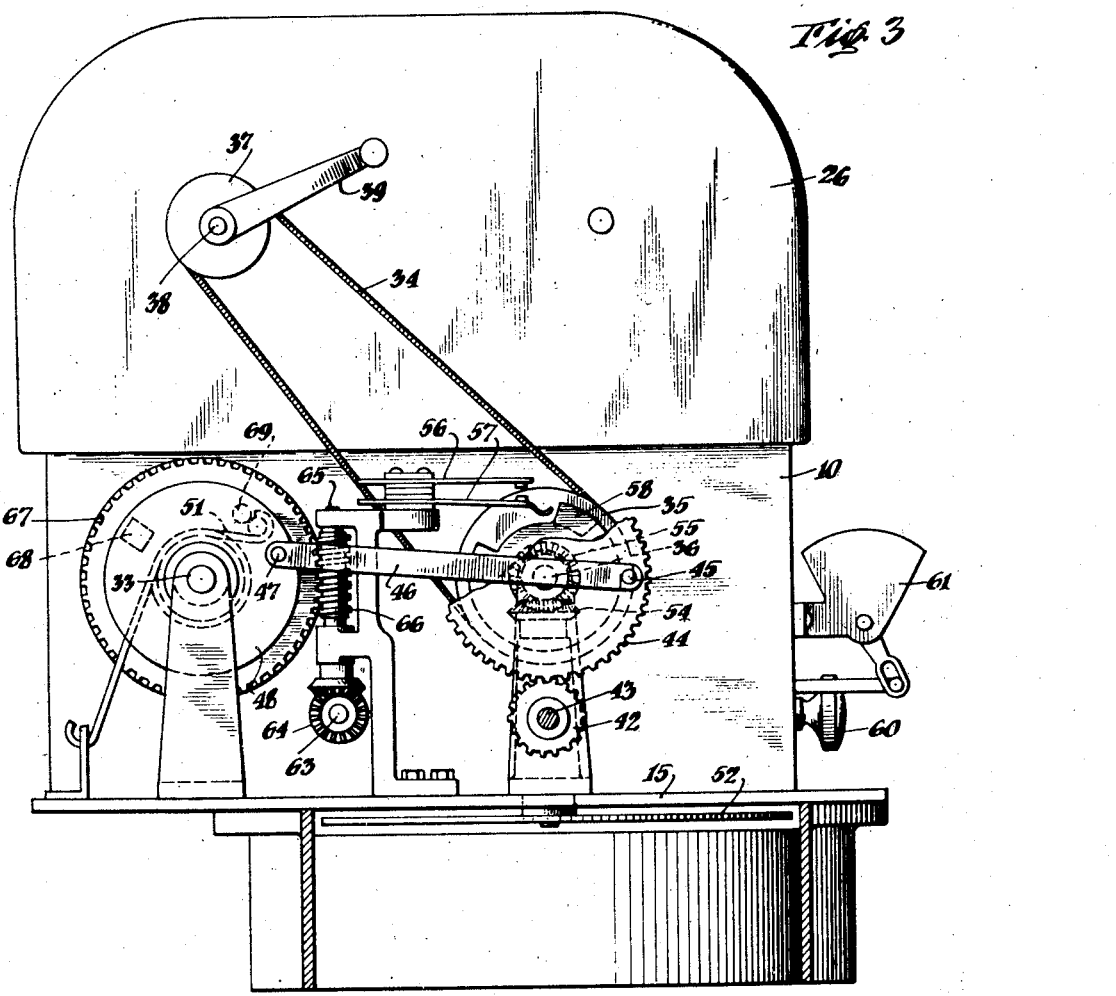
Fig. 3 is an end elevation, partially in section, of the camera shown in Figs. 1 and 2.
Figure 4:
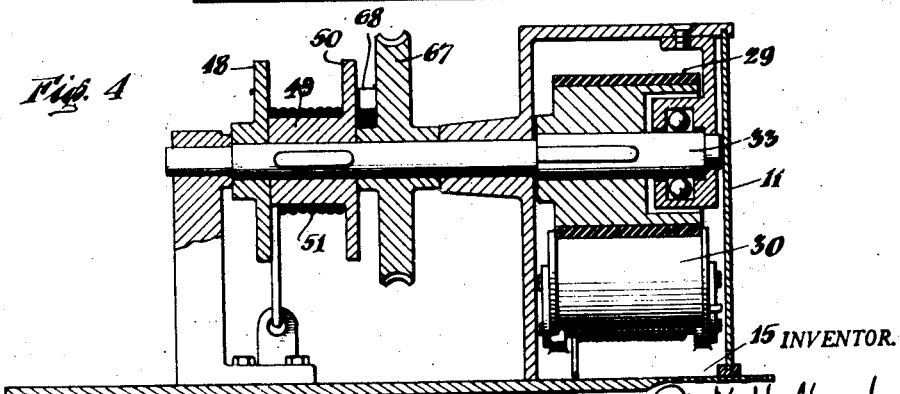
Fig. 4 is a detailed section taken on the line 4—4 of Fig. 1.

The present invention has for its object the provision of a camera having novel and improved means for photographing a succession of records on a long and relatively narrow strip of film. A further object of the invention is the provision of an improved recording camera in which either perforate or imperforate film may be employed, and which embodies novel and improved means whereby the area of the film exposed to the image may be varied as required by the record to be made. A still further object of the invention is the provision of a recording camera having novel and improved means, preferably motor driven, for intermittently feeding the film, holding it from movement during exposure and exposing the film each time for a predetermined time period, and including means for adjusting the film masking means and coordinately regulating and controlling the action of the film feeding means for varying the feeding operation as desired and feeding a required amount of film in an accurate manner on each feed movement so as to avoid film wastage.

As illustratively embodied, the recording camera of the present invention comprises a lens, a rotary shutter, means for accurately positioning a strip of film in the focal plane of the lens, and means for intermittently feeding the film past the exposure area during the time the shutter is closed. This intermittent feeding means comprises a pair of film reels, one from which the film is fed, and the other to which the film is fed, the take-up reel being spring-driven so as to exert a constant tension on the exposed film. At the top and bottom of the film gate between the supply reel and the take-up reel are positioned a pair of clamps or film holding means which normally do not engage the film as it is fed between exposures, but which act to clamp the film firmly against movement during the exposure period. Motor means are preferably provided for moving the various parts and these motor means may be controlled so that a single exposure occurs on each rotation of the motor shaft. To this end, a switch may be provided for setting the motor into operation and a second switch may be provided, which is automatic in action, for stopping the motor at the end of each film exposing operation.

The film feeding means referred to is operated by novel means from the motor. Such means preferably comprises gripping means including a feed roller ball-clutched to an oscillatory shaft whereby film feed motion is imparted to the roller in one direction of movement of the shaft. This shaft is driven from a rotary motor-driven drive shaft through an intervening motion transmitting means or connection whereby the rotary motion of the driving shaft is converted into oscillatory motion of the driven shaft which operates the feed roller. The motion transmitting connection includes a member which drives the feed roller shaft and whose throw or extent of movement may be regulated to vary the extent of oscillation of the shaft and the feed action of the feed roller, whereby the amount of film in length fed up for exposure may be varied. Masking means is provided comprising a variable mask formed of masking elements which are adjustable to vary the size of the exposure area. The means for adjusting these masking elements is also preferably employed to adjust or set a member variably controlling the throw of the member of the motion transmitting connection which operates the feed roller shaft whereby the size of the exposure area and the amount of film to be fed may be simultaneously regulated by operation of a single adjusting means.

By the use of motion transmitting masking and adjusting means of the character described the film feeding means and exposure limiting masks are so interconnected that the masks and feeding means are always properly related so that no wastage of film occurs. Also the feed action is such that at starts and stops no abrupt movements occur liable to cause strain on the parts of film or breakage of the film. Furthermore, the film at the exposure area remains stationary for a period allowing a relatively long exposure to be given, while at the same time the operations may be rapid enough to make a large number of exposures within a given short operating period, which is desirable in recording work.

It will be understood that the foregoing general description, and the following detailed description as well, are exemplary and explanatory of the invention, but are not restrictive thereof.

Referring now in detail to the illustrative embodiment of the invention, the camera comprises a light-tight box or casing 10 having a suitably mounted and secured openable and closable or removable side wall or door 11. On the underside of the casing there is provided a lens and mount 12 which may be focused in the usual manner so as to properly focus the image upon the film 13 within the exposure area defined by the aperture 14 in the double bottom wall 15, 15' of the camera and by the masking elements 16 and 16' which may be variably positioned to limit the length of film exposed. Film 13 moves in a guideway 17 on an apertured bed plate 18 and is adapted to be normally lightly pressed against the bed plate by means of a pressure plate 19 under the action of pressure springs 20 disposed between the pressure plate 19 and the backing plate or head 21. This backing plate is slidably mounted on guide posts 22 encompassed by the springs 20 and is adapted to be periodically forced downwardly thereon to compress said springs by the action of a rotary cam 23 to cause the plate 19 to clamp the film firmly against the bed plate. The plate 19 is normally sustained against the pressure of the springs 20 by retracting springs 24 so that between camming periods the plate 19 will be out of contact with the film as the film is guided by its guide rollers thereby allowing it to have freedom of movement for a feed action.

The film is fed into the camera from a supply reel 25 in a light-tight magazine 26 positioned above and supported on top of the camera, and is led through an aperture 27 into the casing 10 and under a guide roller 28, thence through the film gate and between gripping rollers 29 and 30 and thence out of the casing 10 through an aperture 31 back into the magazine where it is wound upon a take-up reel 32 located in the magazine. Roller 29 is a feed-roller which is ball-clutched to a film driving counter shaft 33, against which roller the film is pressed by the spring-pressed roller 30. The film is gripped between these rollers and pulled by the action of the roller 29 from the reel 25 and through the film gate and wound upon the reel 32. The reel 32 is driven for a take-up operation in accord with the feed action of the roller 29 by means of a spring belt 34 passing over a pulley 35 on a main drive shaft 36 and a pulley 37 on the shaft 38 of the take-up reel. A hand crank 39 may be provided on shaft 38 to adapt the shaft 36 to be hand operated under certain conditions. The cam 23 is operated by the main shaft 36 so that it moves plates 21 and 19 to exert clamping pressure on the film when a portion of film is disposed in position for exposure and relieves said plates from pressure when the film is fed forward.

The means for intermittently advancing the imperforate film a predetermined amount at each feeding operation and for performing this operation with accuracy, comprises, in addition to the gripping rollers 29 and 30, an electric motor 40 driving through a reduction gear 41, a pinion 42 on a shaft 43, which pinion meshes with a main drive gear or toothed crank disk 44 mounted on the rotary main drive shaft 36. This gear 44 is coupled to the counter shaft 33 through a motion transmitting connection whereby each rotary motion of the shaft 36 is translated into an oscillatory movement of the shaft 33.

As embodied, the motion transmitting connection comprises a crank or eccentric pin 45 on the gear 44 which is connected by a link 46 to a crank pin 47 on an oscillatory disk or plate 48 loosely mounted on the shaft 33. Fixed to the shaft 33 is the hub 49 of another oscillatory disk or plate 50 arranged in parallel relation to the disk 48, but spaced therefrom by the hub 49. A coiled spring 51 encircles the hub 49 and is connected to the disks 48 and 50. This spring forms a resilient coupling connection between the two disks whereby motion is transmitted from the disk 48, which has a fixed and invariable throw or motion, to the disk 50, whose throw or range of motion may be the same as that of the disk 48, but is permitted to be changed relative to that of the disk 48, through the elasticity of this spring coupling connection. The throw or range of motion of the disk 50 may be unrestrained, and in such event it will be moved forward and backward to the same degree as the disk 48, when the latter is operated by the gear 44, to transmit a predetermined maximum forward and backward movement to the shaft 33. On such forward movement of the shaft 33 the roller 29 will be turned through its ball-clutch connection with the shaft to feed the film forward a maximum distance. On the backward movement of the shaft 33, however, the roller 29 remains stationary, as the shaft is released from the roll by the ball-clutch connection. Each time shaft 36 makes a complete revolution, which may be in timed accord with each revolution of the motor, an oscillatory feed operation is imparted to the shaft 33.

Shutter means are provided for exposing the film at the exposure area while it is stationary and, as embodied, comprises a sector shutter disk 52 having a cutaway portion or exposure opening of suitable size. This disk is rotatably mounted between the bottom wall 15 of the camera and the false bottom wall 15' and is mounted on and to rotate with a shaft 53 carrying a gear 54 meshing with a gear 55 on the main drive shaft 36. The opening in the shutter may be nearly 270° if desired, as the shutter may be open all the time except when the film is being fed forward.

A switch 56 is provided for connecting the motor with a source of current supply and starting and stopping the apparatus. A second switch 57 controlled by a contact cam 58 is provided in the motor circuit which is closed on a slight movement of the main drive shaft from a starting position and is maintained closed by the cam so that the film is fed, the film clamped by the clamping means, the disk shutter opened, then closed and the clamping means released before the motor is stopped by the opening of the switch by the cam. The switch 57 may also be employed to actuate a signal light showing that an exposure is being made.

Means are provided for adjusting the masks 16 and 16' to vary the effective area of the exposure aperture, and, if desired, such means may also be employed for adjusting a controller which controls the throw of the feed roller shaft actuating disk 50. As shown, a right and left hand threaded shaft 59 is engaged with the masks which are always centered and whereby the masks may be adjusted through rotation of the shaft by means of a knob or other operating element 60. An indicator 61 connected to one of the masks may be employed to indicate the degree of adjustment and operative positions of the masks. Gears 62 connect the shaft 59 with a shaft 63 which is similarly connected by gears 64 with a shaft 65 having a worm 66 engaging a worm wheel 67 loosely mounted on the shaft 33 alongside the disk 50. The wheel 67 is provided with a contact or stop 68 which lies in the path of a contact or stop 69 on the disk 50. By rotation of the wheel 67 the stop 68 may be moved toward or from the stop 69 to control or limit the movement of the disk 50 in its feed roller actuating direction. The above described adjusting means for the masks 16, 16' and controller are so related and coordinated that the feeding action of the film feeding means is always proportionate to the effective area of the exposure opening, the masks being accurately positioned for the length of film to be fed which is regulated by the position of the controller 67 and working movement of the feed roller 30, thereby preventing wastage of film. It will be understood, of course, that gear 67 when adjusted is held fixed or self-locked by its worm gear connection with shaft 65 and that, while disk 48 has fixed forward and backward strokes, disk 50 is permitted through the yielding action of spring 51 to have a variable range of motion, dependent upon the position of stop 68, to vary the feed motion transmitted to roller 29. The stops and spring also form a lost-motion elastic connection which insures a smooth working action of the parts without strain thereon or on the film.

The invention in its broader aspects is not limited to the specific mechanism shown and described, but departures may be made therefrom within the scope of the accompanying claims without departing from the principles of the invention and without sacrificing its chief advantages.

What I claim is:

1. A recording camera having a lens, and film feeding means including a rotary drive shaft, an oscillatory driven shaft, and motion transmitting means between said shafts for translating the rotary motion of the drive shaft into oscillatory motion of the driven shaft, said means including an oscillatory member operated by the drive shaft, an oscillatory member for operating the driven shaft, a resilient connection between said members adapting the throw of the second named member to be varied, said second named member having a contact, and means for variably positioning said variable control element including a worm and worm wheel, said worm wheel carrying said control element, a scale and means movable with said worm for visually indicating on said scale the amount of film to be fed by each throw of said second member.

2. A recording camera having a lens, film supply and take up reels, movable clamping means for clamping the film at the exposure area, masking means adjustable for varying the exposure area, film feeding means including a rotary drive shaft, an oscillatory driven shaft, film gripping members including a feed roll clutched to the driven shaft for feed movement in one direction of movement of said shaft, a motion transmitting connection between the shafts for oscillating the driven shaft from the drive shaft, means for adjusting the masking means to vary the exposure area, including a rod having oppositely threaded portions, a worm driven by said rod and meshing with a worm wheel, a variably positionable stop carried by and settable by the positioning of the worm wheel, for varying the movement of the film feeding means, and scale and pointer means actuated with said rod for visually indicating the extent of said feed.

3. A recording camera having a lens, film supply and take up reels, movable clamping means for clamping the film at the exposure area, masking means adjustable for varying the exposure area, film feeding means including a rotary drive shaft, an oscillatory driven shaft, a film gripping means including a feed roll clutched to the driven shaft for feed movement in one direction of movement of said shaft, a motion transmitting connection between the shafts including an oscillatory member operated by the drive shaft, an oscillatory member for oscillating the driven shaft and a resilient coupling operatively connecting them, means for transmitting different degrees of movement to the driven shaft, including a worm and a worm wheel, a variably positionable stop carried by and settable by the positioning of the worm wheel, for thereby varying the film feed, and means operable simultaneously with the setting of the worm wheel for adjusting the masking means to vary the exposure area.

JOHN K. HOLBROOK.

REFERENCES CITED

The following references are of record in the file of this patent:

UNITED STATES PATENTS

| Number | Name | Date |
| --- | --- | --- |
| 2,099,681 | Drawger | Nov. 23, 1937 |
| 1,975,439 | Uher | Oct. 2, 1934 |
| 1,656,138 | Breslauer | Jan. 10, 1928 |
| 2,003,691 | Lundberg | June 4, 1935 |
| 1,744,773 | Labrely | Jan. 28, 1930 |
| 2,022,891 | Lloyd | Dec. 3, 1935 |
| 1,427,575 | Brenkert, et al. | Aug. 29, 1922 |
| 2,080,100 | Tauschek | May 11, 1937 |
| 1,801,458 | Satterlee | Apr. 21, 1931 |
| 2,001,596 | Caps, et al. | May 14, 1935 |
| 1,818,462 | Caps | Aug. 11, 1931 |
| 2,125,388 | Monroe | Aug. 2, 1938 |
| 2,210,472 | Strotmann | Aug. 6, 1940 |